United States Patent

[11] 3,609,103

[72] Inventors Elroy M. Gladrow;
    Warren M. Smith, both of Baton Rouge, La.
[21] Appl. No. 876,191
[22] Filed Nov. 28, 1969
[45] Patented Sept. 28, 1971
[73] Assignee Esso Research and Engineering Company
    Continuation of application Ser. No. 657,055, July 31, 1967, now abandoned.

[54] HYDROCARBON CONVERSION CATALYSTS CONTAINING DISPERSED CLAY
19 Claims, No Drawings

[52] U.S. Cl. .................................................. 252/455 Z
[51] Int. Cl. .................................................. B01j 11/40
[50] Field of Search ..................................... 252/449, 455 Z

[56] References Cited
UNITED STATES PATENTS

| | | | |
|---|---|---|---|
| 2,535,647 | 12/1950 | Millman et al. | 252/449 UX |
| 3,049,449 | 8/1962 | Allegrini | 252/449 X |
| 3,140,253 | 7/1964 | Plank et al. | 208/120 |
| 3,262,890 | 7/1966 | Mitchell et al. | 252/455 |

Primary Examiner—Daniel E. Wyman
Assistant Examiner—C. F. Dees
Attorneys—Pearlman and Schlager and J. J. Schlager ABSTRACT: The attrition resistance of hydrocarbon conversion catalysts comprising a crystalline aluminosilicate zeolite distributed throughout a clay-containing matrix, preferably a matrix comprising a siliceous gel and a clay, is improved by first dispersing the clay to form particles having a prescribed size distribution prior to its combination with the other two components. The improved product and its use in hydrocarbon conversion reactions is described.

3,609,103

HYDROCARBON CONVERSION CATALYSTS CONTAINING DISPERSED CLAY

This application is a continuation of application Ser. No. 657,055, filed July 31, 1967, now abandoned.

BACKGROUND OF THE INVENTION

1. Field of the Invention

This invention relates to improved hydrocarbon conversion catalyst compositions, methods for their preparation, and uses thereof in hydrocarbon conversion processes. Particularly, the present invention relates to catalyst compositions exhibiting high attrition resistance and comprising crystalline aluminosilicate zeolite suspended in and distributed throughout a clay-containing matrix, preferably a matrix comprising a siliceous gel and a clay. More particularly, this invention relates to a novel and improved method of preparing such catalysts, which involves the dispersion of the clay into finely divided particles having a prescribed size distribution prior to its combination with the other components

2. Description of the Prior Art

Hydrocarbon conversion processes are well known in the art. Typical processes include catalytic cracking, hydrocracking, hydroforming, hydroisomerization hydrodealkylation, and the like. The catalytic treatment of hydrocarbons, particularly those derived from petroleum feedstocks, has seen remarkable improvement over the past several years. The early clay catalysts were replaced by synthetic silica-alumina catalysts which gave significant improvement in activity, selectivity, stability, and attrition. Recently a new breed of hydrocarbon conversion catalysts has evolved and has gained widespread acceptance, particularly in the areas of catalytic cracking and hydrocracking. These new catalysts contain crystalline aluminosilicate zeolites, commonly known as "molecular sieves." They have been shown to exhibit substantially higher activity and/or selectivity in hydrocarbon conversion processing and have been responsible for considerable advances in the art. U.S. Pat. No. Re. 26,188 describes the catalytic properties of these materials.

Crystalline aluminosilicate zeolites, commonly referred to as "molecular sieves," are now well known in the art. They are characterized by their highly ordered crystalline structure and uniformly dimensioned pores, and are distinguishable from each other on the basis of composition, crystal structure, adsorption properties, and the like. The term "molecular sieves" is derived from the ability of these zeolite materials to selectively adsorb molecules on the basis of their size and form. The various types of molecular sieves may be classified according to the size of the molecules which will be rejected (i.e. not adsorbed) by a particular sieve. A number of these zeolite materials are described, for example, in U.S. Pat. Nos. 3,013,982—86, wherein they are characterized by their composition and X-ray diffraction characteristics.

THese crystalline zeolites, while being remarkable catalysts in their own right, are often subject to various drawbacks depending on their intended use. Thus, for example, when used in typical fluidized systems, their particular size is often too small for practical and economic operation. Moreover, the catalytic activity of these materials is often excessive for the particularly desired yield and/or product distribution due to overconversion of the feed. These disadvantages may have led to the widespread use, particularly in catalytic cracking, of hydrocarbon conversion catalysts comprising these molecular sieves embedded in and/or distributed throughout (e.g. "encapsulated") a synthetic matrix material such as s siliceous gel or cogel such as silica, silica-alumina, silica-magnesia, etc. The art has also disclosed the use of natural clay matrix, as well as the use of various combinations of clays and siliceous gels. The incorporation of clays into catalysts is of obvious value; catalysts costs are reduced proportionately, since the clay is the least expensive component. The incorporation of clays into the old amorphous siliceous gel catalysts, e.g. silica-alumina, while cost-reducing raw materialwise, led to higher attrition losses under the high severity conditions commonly encountered in commercial units. Similarly, the recently developed crystalline zeolite-siliceous gel-clay matrix catalysts referred to above, while of lower manufacturing cost due to the replacement of a portion of the siliceous gel with clay, also, suffer from low resistance to attrition. The attrition losses accruing from the use of these molecular sieve-siliceous gel-clay matrix catalysts very often renders them unsuitable for use in commercial fluidized solids cracking units or cancels any credits accruing from their lower manufacturing costs. It is against this background that the present invention has evolved with the provision of an improved means for preparing these catalysts, so as to substantially overcome the aforementioned problems and to produce highly improved hydrocarbon conversion catalysts.

SUMMARY

It has now been found that improved hydrocarbon conversion catalysts of the crystalline zeolite variety having increased resistance and characterized by incorporation of the zeolite into a clay-containing matrix, preferable a matrix containing a clay and a siliceous gel, can be prepared by suitably dispersing the clay into finely divided particles of a prescribed size distribution prior to its combination with the crystalline zeolite or siliceous gel. Heretofore, the importance of particle size and distribution of the clay has not been fully appreciated. Conventional techniques for placing the clay in a combinable form, such as slurring the clay in water, silica hydrogel, aqueous acids, sodium hexa meta phosphate, alum solution, etc. have been employed, without catalyst composes to or appreciation of the important parameter of particle size distribution. It has been found, in connection with the present invention, that dispersion of the clay into the particle size distribution to be hereinafter set forth ensures a stronger, attrition-resistant, ultimate catalyst, which additionally often demonstrates higher catalytic activity than similar catalysts prepared without regard to the particle size distribution of the clay. Without intending to be limited in any way by the theory presented, it is believed, at least in the case of these catalysts containing crystalline zeolite particles distributed throughout a clay-siliceous gel matrix, that the observed improved attrition resistance is largely due to a more uniform distribution of "meshing" of the clay particles with the siliceous gel so that the resulting composite catalyst comprises particles of increased strength.

CATALYST COMPOSITION

The catalyst compositions of the invention will comprise crystalline alumino-silicate zeolite, clay and, preferable in addition, a siliceous gel or cogel. These components will now be described in detail.

Crystalline Alumino-Silicate Zeolite Component

The crystalline alumino-silicate zeolites used in the present invention should have uniform pore openings of about 3 to 15 Angstrom units, more preferably about 7 to about 13 Angstrom units. These values refer to the effective pore diameter of the pore openings; i.e. the diameter at the conditions of use capable of substantially admitting entry to smaller size molecules while substantially excluding larger size molecules.

Suitable natural crystalline zeolites are exemplified by the minerals faujasite and mordenite, chabazite, gmelinite, analcite, erionite, etc., which may be effectively employed in the invention. Synthetically produced alumino-silicate zeolites having the required pore diameters will, however, be preferred in the present invention, and are exemplified by materials such as synthetic faujasite, synthetic mordenite, Zeolite X (U.S. Pat. No. 2,882,224), Zeolite Y (U.S. Pat. No. 3,130,007), Zeolite L, Zeolite A, etc. In general, crystalline alumino-silicate zeolites, in natural or synthetic form, contain a substantial portion, e.g. above about 8 wt. percent, of an alkali metal oxide, e.g. sodium oxide, before ion exchange treatment.

More specifically, the preferred crystalline alumino-silicate zeolites employed in the present invention will have the following chemical formula in the anhydrous form expressed in terms of moles:

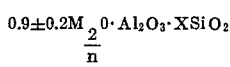

In the above formula, M is selected from the group consisting of metal cations and hydrogen, $n$ is the valence of M, and X is a number in the range of from about 1 to about 10. Preferably, X will be above about 2.5, more preferably above about 3, e.g. up to about 1, and most preferably 4 to 6. In the large pore variety, i.e. above 6 Angstrom units, crystalline zeolites having relatively high silica-to-alumina ratios, i.e. above about 3, have been found to be more active, selective and stable than those having relatively low ratios, e.g. 2. The most preferred large pore synthetic zeolites for use in the present invention will have a crystal structure similar to the natural mineral faujasite and have a silica-to-alumina mole ratio above 3 i.e. "Zeolite Y." Use of "small pore" zeolites is also contemplated, i.e. those having pore openings less than 6 Angstrom units, such as Zeolite A, erionite, chabazite, etc. For use in the present invention a substantial portion of the alkali metal, e.g. sodium, in the zeolite as naturally occurring or as prepared synthetically, is replaced with a cation (either a metal cation or a hydrogen-containing cation, e.g. $NH_4^+$) so as to reduce the alkali metal oxide (e.g. $Na_2O$) content to less than about 8 weight percent. Preferably, a major portion of the cation content of the zeolite is supplied by a cation other than sodium. More preferably, less than about 5 weight percent and most preferably about 1 to 5 wt. percent $Na_2O$ (based on zeolite) will remain. The base exchange may be performed on the crystalline zeolite prior to its encapsulation in the clay or the siliceous-clay matrix. More preferably, however, the ion exchange will be accomplished after the encapsulation, i.e. after the unexchanged zeolite has been combined with the matrix.

The processes for preparing crystalline alumino-silicate zeolites are now well known in the art. These methods generally involve the reaction of predetermined amounts and ratios of silica, alumina and sodium hydroxide. Alumina may be supplied in the form of sodium aluminate or an alumina sol or the like silica may be supplied in the form of sodium silicate and/or silica gel and/or silica sol, and alkali may be furnished by an alkaline hydroxide, e.g. sodium hydroxide, . As taught in the art, careful control is kept over the pH, sodium ion concentration and the crystallization period. Suitable processes for preparing crystalline zeolites are described, for example, in U.S. Pat. Nos. 2,882,244, 2,971,903 and 3,130,007.

Base exchange of the zeolite may be performed either before of after the zeolite is combined with the clay or the clay-siliceous gel matrix. Preferably, base exchange will be performed after mixing of the zeolite and matrix by exchanging the spray dried or tray dried zeolite-matrix product with an aqueous solution of the desired cation or cations to replace the alkali metal originally in the zeolite. Base exchange is effected by treatment with a solution containing a cation capable of replacing alkali metal, and is continued for a sufficient period of time to reduce the alkali metal content to the desired values hereinbefore set forth. The cation used for the base exchange can be a metal cation or a hydrogen-containing cation or a mixture thereof. The metal cation can be a cation of metals in Groups I-B to VIII and the rare earth metals, more preferably metals in Groups II A, III A and the rare earth metals. More than one cation can be introduced either simultaneously or by successive exchange treatments. Particularly preferred cations will be hydrogen or hydrogen-containing cations, e.g. ammonium ion, and/or alkaline earth metal cations e.g. magnesium cations. Examples of other suitable cations include barium, calcium, individual or mixtures of rare earth metals such as cerium, praseodymium, lanthanum, neodymium and samarium, as well as manganese, strontium, zinc, zirconium, etc. It will be understood that mixtures of there various cations, and mixtures of the same with other ions, such as ammonium, can be employed. While base exchange is ordinarily conducted in an aqueous medium, nonaqueous solutions, e.g. alcoholic solutions, can be employed, assuming of course that ionization can occur.

Base exchange treatment is accomplished in conventional manner by procedures well known to the art. Normally, the zeolite or zeolite-containing product is exchanged with a suitable salt of the above metals or a hydrogen-containing cation solution, at a temperature of 60° to 180° F. via conventional ion exchange techniques. Suitable salt solutions include the sulfates, nitrates, chlorides, carbonates, etc. Organic salts can also be used such as acetates, formates, etc. The cation concentration in the treating solution and the length and number of ion exchange treatments will readily be determined according to the extent of ion exchange desired. Similarly, the temperature at which base exchange can be effective is subject to wide variation, generally from room temperature to an elevated temperature below the boiling point of the treating solution. Usually an excess of base exchange solution will be employed as will be readily apparent to those skilled in the art. It will be appreciated that the period of contact, temperature, concentration of treating solution, etc., are all interrelated variables which will be again determined by the degree of ion exchange necessary to reduce the alkali metal oxide content of the zeolite to the values hereinbefore set forth. After the base exchange treatment, the product is water washed to remove residual extraneous salts, etc., and then dried either at ambient temperature or at elevated temperature, e.g. 150° to 600° F.

Clay Component

Representative of the clays that may be utilized in the present invention include those in the general classification of halloysite, illite, kaolinite, montmorillonite, and palygorskite, as well as various unclassified groups.

Members of the halloysite group conform to the general formula $Al_2Si_2O_5(OH)_4$ and include: allophane, endellite, halloysite, indianaite, metahalloysite, schrotterite, etc.

Members of the illite group have a composition expressable as $(OH)_4K_4(Al_4 \cdot Fe_4 \cdot Mg_6Si_{814} \cdot Al_y) O_{20}$. Examples are brammallite, bravaisite, glimmerton, hydromica, sercicite, etc.

Kaolinite has a general formula of $Al_2O_3 \cdot 2 \cdot 2H_2O$ and is commonly found with other members of the kaolinite group including: anauxite or ionite, collyrite, dickite, ferrikaolinite, nacrite, neokaoline, metakaolin, metanacrite, severite, etc.

The montmorillionite group includes the following: "Amargosite" beidellite, bentonite, chloropal, erinite, ferro-montmorillonite, hectorite, metabentonite, montmorillonite, nontronite otaylite, saponite, etc.

The palygorskite group includes the following clays: attapulgite, calciopalygorskite, lasallite, palygorskite, paramontmorillonite, parasepiolite, sepiolite, etc.

Various unclassified clays which can be treated are: faratsihite, glacialite grundite, potash montmorillonite, potash bentonite, ptilolite, sericite, muscovite, degraded feldspar, feldspathiod, etc.

A preferred clay is kaolin largely because of its low cost and availability.

In some instances, it may be necessary to leach the clay with acid to remove residual alkali metals and objectionable metals, such as iron and the like.

In accordance with the invention, the clay is combined with the other components in a highly dispersed, subdivided state. Usually, about 40 to 95 percent of the clay particles should have a particle size less than 0.3 microns. The following table summarizes the preferred particle size distribution of the clay particles for obtaining the attrition resistant catalysts of the invention.

| % of Total Particles | Particle Size (Microns) |
| --- | --- |
| 50 to 90 | 0.05 to 0.3 |
| 10 to 40 | 0.3 to 0.5 |
| 0 to 10 | 0.5 to 1.0 |

More preferably 70 to 90 percent of the clay particles will fall in the above less than 0.3 micron particle size range. Particle size distribution can readily be determined by sedimentation methods or by visual measurements of particle size by means of high magnification electro micrographs. The latter method was used herein and provides a direct particle size measurement.

Siliceous Gel or Cogel Component

The siliceous gel which serves as part of the matrix in which the above crystalline zeolite is uniformly distributed, i.e. "encapsulated," can be silica gel per se, or more preferably a cogel of silica and an oxide of at least one metal selected from the group consisting of metals of Groups II-A, III-A, and IV-B of the Periodic Table; as set forth on pages 394 and 395 of the *Handbook of Chemistry and Physics*, 38th Edition (1956—57). The terms "gel" and "cogel" as used herein are intended to include gelatinous precipitates, hydrosols, hydrogels, etc. Suitable cogels include, for example, silica-alumina, silica-magnesia, silica-zirconia, silica-thoria, silica-beryllia, silica-titania, as well as ternary combinations such as silica-alumina-zirconia, silica-alumina-magnesia, silica-magnesia-zirconia, etc. Preferred cogels will include silica-alumina, silica-alumina-zirconia, and silica-magnesia, with silica-alumina being particularly preferred. These gels and cogels will generally comprise a major proportion of silica and a minor proportion of the other aforementioned oxide or oxides. Thus, the silica content of the siliceous gel or cogel will generally fall within the range of 55 to 100 weight percent, preferably 60 to 90 weight percent, and the other metal oxide or oxides content will generally fall within the range of 0 to 45 weight percent, preferably 10 to 40 weight percent. For the particularly preferred silica-alumina, the alumina content will be about 8 to 40 weight percent, preferably 12 to 30 weight percent. Siliceous hydrogels utilized herein, e.g. silica-alumina hydrogel or gelatinous coprecipitate, can be produced by any of a number of known methods. They may be used as commercially supplied or may be separately prepared. For example, siliceous hydrogels can be prepared by hydrolysis of ethylorthosilicate, acidification of an alkali metal silicate, etc. Thus, a suitable silica-alumina hydrogel can be produced by preparing a hydrous precipitate of silica by mixing a solution of sodium silicate with an acid, e.g. sulfuric acid, to produce a slurry having a pH below 7, usually about 5; after aging for 0.5 to 1.0 hours a solution of an aluminum salt, e.g. aluminum sulfate, is added and the pH of the mixture is brought to above about 5.5 by addition of alkaline material, e.g. ammonia, in order to precipitate alumina.

Other Components

In addition to the above components, the catalysts of the invention may include various other components such as magnesia, zirconia, titania, and beryllia, pilling aids, or relatively inert fillers and the like to adjust density, activity, form, extrudability, etc. Further, cation exchanging of the crystalline zeolite component is usually necessary as has been described above. This exchange may be performed prior to or subsequent to the incorporation of the zeolite into the clay or clay-siliceous gel matrix. Additionally, in many instances, particularly for use in hydro processes such as hydrocracking, it will be preferred to incorporate or deposit of the total composition with the remainder substantially being the clay.

In the more preferred catalyst composition the matrix will be composed of both clay and a siliceous gel or cogel of the type described previously. In this case the proportions of the three ingredients will be in the following approximate ranges:

|  | General | Preferred | Particularly Preferred |
| --- | --- | --- | --- |
| Crystalline Zeolite | 2 to 25 | 4 to 15 | 5 to 10 |
| Siliceous Gel or Cogel | 25 to 78 | 40 to 71 | 50 to 65 |
| Clay | 20 to 50 | 25 to 45 | 30 to 40 |

Where additional metals or other components are to be introduced, the above percentages will be reduced proportionately. Non-precious metal hydrogenation components will usually be incorporated in amounts ranging from about 3 to 30 weight percent, preferably 4 to 20 weight percent, based on the total composition. Precious metal hydrogenation components will generally be present in less than about 1 weight percent concentration and preferably present in the range of 0.1 to 0.6 weight percent.

CATALYST PREPARATION

The catalysts of the present invention are prepared by intimately admixing the aforedescribed components and thereafter obtaining a composite product composite product comprising the zeolite component uniformly distributed throughout and suspended in the clay matrix or the siliceous gel-clay matrix. The formation of these catalysts can be achieved by various means. In all cases, suitable hydrogenation metals either in the zeolite per se or in the matrix material(s) or in both. Typical hydrogenation components will include metals in Groups V-B, VI-B, and VIII, and particularly in Groups VI-B and VIII. Metals especially preferred for hydrocracking will be platinum, palladium, nickel, tungsten, cobalt and molybdenum. Mixtures of two or more of such metals can also be employed. Again, deposition or impregnation of such metals can be accomplished prior to or subsequent to incorporation of the zeolite into its matrix, although it will be preferred to do so subsequently. Conventional impregnation procedures will be used; e.g. slurrying of the zeolite-clay-siliceous gel matrix in suitable solutions containing metal salts or other compounds followed by subsequent conversion of the metal to a catalytically active state as by oxidation and reduction and/or sulfiding.

Proportions of Catalyst Components

Two types of catalysts are contemplated herein. In the less preferred, clay will be the sole matrix material and the crystalline zeolite will comprise about 2 to 25 weight percent, preferably about 4 to 15 weight percent, more preferably 5 to 10 weight percent, of the total composition with the remainder substantially being the clay.

In the more preferred catalyst composition the matrix will be composed of both clay and a siliceous gel or cogel of the type described previously. In this case the proportions of the three ingredients will be in the following approximate ranges:

|  | General | Preferred | Particularly Preferred |
| --- | --- | --- | --- |
| Crystalline Zeolite | 2 to 25 | 4 to 15 | 5 to 10 |
| Siliceous Gel or Cogel | 25 to 78 | 40 to 71 | 50 to 65 |
| Clay | 20 to 50 | 25 to 45 | 30 to 40 |

Where additional metals or other components are to be introduced, the above percentages will be reduced proportionately. Non-precious metal hydrogenation components will usually be incorporated in amounts ranging from about 3 to 30 weight percent, preferably 4 to 20 weight percent, based on the total composition. Precious metal hydrogenation components will generally be present in less than about 1 weight percent concentration and preferably present in the range of 0.1 to 0.6 weight percent.

CATALYST PREPARATION

The catalysts of the present invention are prepared by intimately admixing the aforedescribed components and thereafter obtaining a composite product comprising the zeolite component uniformly distributed throughout and suspended in the clay matrix or the siliceous gel-clay matrix. The formation of these catalysts can be achieved by various means. In all cases, however, it is essential in the practice of the present invention to disperse the clay component to achieve the aforedescribed particle size distribution prior to combination of the clay with the other two components. Dispersion of the clay can be accomplished by any of the well known means, such as by adding inorganic salts. However, it has been found that certain salts and amounts thereof are more effective than others and are therefore to be preferred. The preferred dispersant materials which can be added to the clay to achieve the fine dispersion required herein include the alkali metal phosphates, carbonates and silicates, such as potassium carbonate, sodium hesa meta phosphate, potassium silicate, and sodium silicate. The alkali metal silicates will be particularly preferred, with sodium silicates the most preferred because of their low cost. While sodium silicates in general are highly effective dispersants, the material known as "N-brand" and having an approximate molar formula of about $Na_2O \cdot 3.25SiO_2$ will be the especially preferred form. Likewise, the potassium silicate having the approximate molar formula of about $K_2O \cdot 3.45SiO_2$ will be the especially preferred form. The amount of dispersant utilized will, of course, depend upon the particular type used and its dispersing power. In the case of potassium carbonate, for example, amounts within the range of 0.01 to 10, preferably 0.05 to 1.0, weight percent of the clay material will be used; whereas in the case of the sodium silicate 0.05 to 12, preferably 0.5 to 5.0, weight percent of the clay material will be utilized.

The preferred manner of combining the catalyst components to achieve the ultimate catalyst composition involves the separate slurrying of the clay and the dispersant in water. The clay content of the slurry is preferably in the range of about 10 to 30 weight percent, more preferably about 15 to 25 weight percent, e.g. 20 weight percent. Where the dispersant is sodium silicate (N-brand preferred), it will preferably be used in a concentration of 0.1 to 3, more preferably 0.2 to 1.5, still more preferably about 0.25 to 1.25, and most preferably about 1.0, weight percent, based on the weight of the clay. The temperature of the slurry will preferably be in the range of about 70° to 150° F. and the slurry is continuously stirred for at least 15 minutes to ensure deagglomeration.

The dispersed clay slurry is combined with a water slurry of the zeolite component which preferably may have been first colloid milled to achieve a fine dispersion of the zeolite. If the ultimate catalyst is to contain the siliceous gel component, the combined clay-zeolite slurry is added to the siliceous hydrosol or hydrogel of the type hereinbefore described and the composite slurry colloid milled, if desired, and ultimately spray dried. Various alternate procedures will be evident to those skilled in the art. The catalyst composition of the invention can be prepared by various alternate techniques for forming composite slurries of the zeolite-clay-siliceous gel or hydrosol and water followed by spray drying to form microspherical catalyst particles, or by passing the mixture as droplets into hot oil to produce beads, or by tray drying to make the material suitable for shaping into tabletted or extruded pellets.

Without intending to be restrictive but merely by way of illustration, several possible ways of preparing the catalyst of the present embodiment of the instant invention are outlined as follows.

As a first procedure, the desired form of the zeolite (either alone or in the mother liquor resulting from the synthesis of the zeolite crystals) is admixed with silica hydrosol and then an alum solution is added. After precipitating the alumina by adjusting the pH to 5.0 to 7.0, a slurry of finely divided clay in the desired amount is then blended in with the composite and the total mixture is spray dried to form the catalyst composition particles.

As a second method, unwashed silica-alumina hydrogel is mixed with a slurry of the desired form of the molecular sieve zeolite and the resulting composite is then mixed with a slurry of finely dispersed clay. This final mixture is then subjected to a spray drying step as above to form the desired catalyst particles.

As a third possible procedure, unwashed silica-alumina hydrogel is first mixed with deagglomerated clay slurry and then the composite is mixed with a slurry of the desired form of the molecular sieve. The total mixture is then spray dried as above.

As a fourth method of preparation, the desired form of the molecular sieve is first mixed with a slurry of deagglomerated clay and the resulting mixture is then added to unwashed silica-alumina hydrogel. The total mixture is then spray dried as before.

As a fifth alternative method preparation, the desired form of the molecular sieve (either alone or in its mother liquor) is first admixed with silica hydrosol and then a finely divided clay slurry is introduced, followed by the addition of aluminum sulfate and subsequent precipitation of the alumina with ammonia. The total composition is then spray dried as above.

The spray dried material from the above procedures is subjected to a washing step followed by a cation exchange step and, if desired, metal impregnation step in accordance with the foregoing descriptions. As previously mentioned, such cation exchange and/or impregnation of metals can be accomplished on the zeolite component per se prior to its combination with the other components, although subsequent treatment of the composite catalyst will be preferred.

Hydrocarbon Conversion Processes

Using Catalyst of the Invention

The catalyst compositions hereinbefore described are highly effective for various hydrocarbon conversion reactions, the most notable of which being catalytic cracking. Moreover, it is within the scope of the present invention to modify the catalyst composition by incorporation of various other catalytic components capable of promoting a particularly desired reaction or of shifting a particular equilibrium in a desired direction. For example, it may be desired to incorporate a hydrogenation component, e.g. a noble metal, for such reactions as hydrocracking, hydrodealkylation, hydroisomerization, hydrofining, hydrodesulfurization, hydrodenitrogenation, etc.

Catalytic cracking with the catalyst composition hereinbefore described can be carried out in conventional manner. Suitable catalytic cracking conditions include a temperature within the general range of 700° 1,200° F. and a pressure ranging from subatmospheric pressure up to several hundred atmospheres. The usual conditions which will be employed will include a temperature of about 750° to 1,000° F., e.g. 875° to 980° F., and a pressure of atmospheric to 100 p.s.i.g., e.g. atmospheric to about 20 p.s.i.g. The process can be carried out in fixed bed, moving bed, slurry, or fluidized bed operation, the latter being preferred. The contact time of the oil with the catalyst will depend upon the particular feed and the particular results desired to give a substantial degree of cracking to lower boiling products. Suitable catalyst-to-oil ratios will range from about 1 to 1 to about 20 to 1, preferably 5 to 10 to 1.

While the catalysts of the invention will be most useful in catalytic cracking processes, other hydrocarbon conversion processes can also effectively employ these catalysts. The operating conditions to be employed will, of course, vary with the particular conversion reaction desired. The following table summarizes typical reaction conditions effective in the present invention.

The feedstocks suitable for conversion in accordance with the invention include any of the well-known feeds conventionally employed in hydrocarbon conversion processes. Usually, they will be petroleum derived, although other sources, such as shale oil, are not to be excluded. Typical of such feeds are included heavy and light virgin gas oils, middle distillates, steam cracked naphthas, coker naphthas, catalytically cracked naphthas, cycle oils, deasphalted residua, etc.

PREFERRED EMBODIMENTS

In order to further describe the invention and to provide a disclosure of the preferred embodiments thereof, there is set forth below several specific examples disclosing the manner and the nature of the chemical agents with which the clay particles may be dispersed or deagglomerated before forming the final catalyst composite. The following examples are directed to those skilled in the art and deal with types of chemical reagents suitable for performing the functions intended and securing the desired final results. It is not the intent, however, to be bound by any particular theories or mechanisms presented nor to limit the scope of the invention to particular species described, as obvious equivalents may well occur to those skilled in the art.

EXAMPLE 1

This example demonstrates dispersion of the clay component and shows that there is no apparent effect of pH of the dispersing agent on its ability to deagglomerate clays. The clay used was a Georgia while kaolin with the bulk of the particles in the 1 3 micron size range. In each experiment, 100 grams (dry basis) of the clay were slurried in 500 cc. of a solution of the reagent being studied. These reagents covered a wide range of pH. Treating time was 2.5 hours at 140° F. with continual stirring. For purposes of comparison, a "water only" treated sample served as the reference. The kaolin samples after the treat period were filtered, washed well, and dried. The dried samples were prepared for the electron microscope examination by dispersing a small amount of each sample in butyl alcohol by ultrasonics. Droplets of the resulting butyl alcohol suspensions were placed on carbon coated sample grids and allowed to dry before examination in the electron microscope. Electron micrographs at 50,000X magnification were taken of representative fields in each sample and the resulting micrographs compared with the "water only" treated kaolin to determine the effectiveness of the various chemical agents on aggregate and particle structure and on degree of dispersion. The results are given in table 1.

dosage treats, are more effective in deagglomerating the kaolin. In addition to N-brand sodium silicate, other reagents were investigated; e.g. potassium silicate ($K_2O \cdot 3.45SiO_2$), which was found to be just as effective as the N-brand sodium silicate. Sodium meta silicate ($Na_2O \cdot SiO_2$) was found to provide mediocre dispersion. Sulfuric acid chemically etched the kaolin without dispersing the agglomerates.

In another set of experiments, kaolin was treated with N-brand sodium silicate solution at various dosage levels. The effectiveness was determined by means of electron micrographs as described above. The results are presented in table 2.

TABLE II

Deagglomeration of kaolin by sodium silicate[1] at varying dosage level — 100 g. kaolin; 500 cc. solution ; 2.5 hrs. treat time; 140° F.]

| Dosage level:[2] | Electron microscope observations |
|---|---|
| 10.0 | Poor deagglomeration action. |
| 2.6 | Fair dispersing action. |
| 1.04 | Good dispersing action. |
| 0.26 | Very good. Most particles 0.1 to 0.3 microns. |

[1] $Na_2O \cdot 3.25SiO_2$.
[2] Dosage calculated as grams $Na_2O$/100 grams kaolin.

Inasmuch as the electron micrographs of the treated samples were compared to that of a water only treated sample, it appears that an optimum range of sodium silicate dosage exists as previously set forth. The data also show that a higher dosage levels the dispersing ability becomes progressively poorer.

In still another experiment, 100 grams kaolin were treated with a slurry of sodium synthetic faujasite contained in the mother liquor resulting from its synthesis. The mother liquor comprised 2.14 grams $Na_2O$ as soluble silicate and 13.2 grams Na-faujasite. Treat conditions were the same as described above. An electron micrograph of the treated material showed a fair dispersing action on the clay by the synthesis liquor.

EXAMPLE 2

This example demonstrates that dispersing or deagglomerating the clay with N-brand sodium silicate before admixture with silica-alumina cogel and faujasite results in a superior cracking catalyst.

For purposes of comparison, a catalyst was prepared without clay dispersion as follows: 11 lbs. of kaolin (9.5 lbs.

TABLE I

[Deagglomeration of kaolin with reagent solutions of varying pH—100 g. kaolin; 2.5 hrs. treat time; 500 cc. solution; 140° F.; $H_2O$ washed]

| Sample | Reagent | Percent dosage[1] | pH of solution | Appearance of micrograph (comparison—$H_2O$) |
|---|---|---|---|---|
| 1A | NaOH | 0.2 | 11.7 | No deagglomeration. |
| 1B | NaOH | 1.0 | 11.9 | No effect. |
| 2A | $Na_2O \cdot 3.25SiO_2$ | 0.2 | 10.1 | Very good deagglomeration. Most particles 0.1 to 0.4μ. |
| 2B | $Na_2O \cdot 3.25SiO_2$ | 1.0 | 10.2 | Very good deagglomeration. Not quite as good as above. |
| 3A | $NH_4OH$ | 0.2 | 10.2 | Very little deagglomeration, if any. |
| 3B | $NH_4OH$ | 1.0 | 10.7 | Very little deagglomeration. |
| 4A | $K_2CO_3$ | 0.1 | 9.0 | Very good deagglomeration. Most particles 0.2 to 0.5μ. |
| 4B | $K_2CO_3$ | 1.0 | 9.2 | Very good deagglomeration. |
| 5A | $(NH_4)_2CO_3$ | 0.2 | 8.7 | Very little deagglomeration, if any. |
| 5B | $(NH_4)_2CO_3$ | 1.0 | 8.9 | No effect. |
| 6A | $Na_2SO_4$ | 0.2 | 7.2 | Some deagglomeration—mediocre. |
| 6B | $Na_2SO_4$ | 1.0 | 6.8 | Very little deagglomeration. |
| 7A | $K_2SO_4$ | 0.2 | 7.2 | Good deagglomeration. |
| 7B | $K_2SO_4$ | 1.0 | 6.8 | Some deagglomeration—mediocre. |
| 8A | $(NH_4)_2SO_4$ | 0.2 | 6.6 | Very little deagglomeration. |
| 8B | $(NH_4)_2SO_4$ | 1.0 | 6.0 | Do. |
| 9A | $NaHSO_4$ | 0.2 | 3.4 | No effect. |
| 9B | $NaHSO_4$ | 1.0 | 2.7 | Do. |

[1] Dosage calculated as grams $Na_2O$ or $K_2O$ or $(NH_4)_2O$/100 grams kaolin.

The above data show no clear evidence that deagglomeration is dependent primarily on pH alone, but rather that the effectiveness of each reagent is a characteristic property of that reagent. It further appears that more dilute solutions, or lower dry basis) were slurried in 90 lbs. of water. To this slurry, with stirring, 1.44 lbs. of Na-faujasite were added. In a separate vessel 1·17 lbs. of an unwashed silica-alumina hydrogel (12.2 weight percent dry solids) were blended with 80 lbs. $H_2O$ and the mixture passed through a colloid mill. The silica-alumina hydrogel had been made previously by gelling N-brand sodium silicate solution (comprising about 6 to 8 percent silica equivalent) by addition of $CO_2$, aging the hydrogel, and then admixing with sufficient alum solution to incorporate about 14 percent $Al_2O_3$ into the silica and stabilizing the pH at about 5.5 to 7.0. The unwashed mixed hydrogel was then filtered to give the above-mentioned 12.2 weight percent dry solids content. The colloid milled silica-alumina slurry was then blended into the slurry of kaolin and faujasite. After admixture, the composite was passed through the colloid mill to assure homogeneity and then spray dried. The material was washed and exchanged with pH controlled ammonium sulfate solution to remove residual soluble salts and then oven dried. This material is referred to as catalyst A and had a nominal composition after calcination of about 5 percent H-Y type faujasite—37%kaolin—58 percent ($SiO_2/Al_2O_3$).

A catalyst of the invention was prepared with clay dispersion as follows: in a vessel, 12 lbs. kaolin clay (10.4 lbs. dry basis) were slurried in 58lbs. $H_2O$. To the slurry were added 100 cc. of N-brand sodium silicate (40° Be.; equivalent to 13.0 grams $Na_2O$ or 0.27 percent $Na_2O$ based on the kaolin). The total slurry was heated to 140° to 160° F. and kept at this temperature range for 24 hours with constant slow stirring. In a second vessel, 1.89 lbs. sodium faujasite were slurried in 10 liters $H_2O$, colloid milled twice, and then added to the kaolin slurry with continued slow stirring. In a third vessel, 176 lbs. unwashed silica-alumina hydrogel, described in making catalyst A above, were mixed with 125 lbs. $H_2O$) and colloid milled. With continual stirring, the silica-alumina hydrosol slurry was added to the deagglomerated kaolin-faujasite slurry and the composite mixture was colloid milled and spray dried. The material was washed and exchanged with pH controlled ammonium sulfate to remove residual soluble salts, followed by water and oven dried. This material, which will be referred to as catalyst B, had a nominal composition after calcination of about 4.9% H-Y type faujasite—31 percent kaolin—64 percent silica-alumina.

A catalyst comprising 5 percent H-Y type faujasite (after calcination) dispersed in 95 percent silica-alumina (no kaolin added) and which represented a commercially available cracking catalyst is designated catalyst C.

Another catalyst of commerce comprising about 8 to 10 weight percent rare earth form of X-type faujasite, about 32 percent clay, and about 60 percent silica-alumina is designated as catalyst D in subsequent examples.

Still another catalyst of commerce is a silica-alumina (13% $Al_2O_3$) amorphous gel catalyst and this material is designated catalyst E in subsequent examples.

EXAMPLE 3

Portions of catalysts A, B, C, D and E were each heated at 1,000° F. for 6 hours and then tested for attrition resistance by exposure to a high velocity jet of air. The results follow, wherein the attrition rate is expressed as the hourly rate of formation of fines of about 16 microns or less in average diameter.

TABLE III

| Catalyst | A | B | C | D | E |
| --- | --- | --- | --- | --- | --- |
| Attrition Rate, %/Hr. | 16.8 | 3.2 | 4.0 | 7.5 | 3.2 |

It is observed that the catalyst of the invention, i.e. catalyst B, was as attrition resistant as the best all-synthetic catalyst of commerce, catalyst E; was materially better than commercial zeolite-clay containing catalyst D; and was marginally better than zeolite containing all-synthetic matrix catalyst C. Of great significance is the improvement shown by the catalyst of the invention, catalyst B, over catalyst A which used the same ingredients but was prepared without the clay dispersion or deagglomeration step.

EXAMPLE 4

Portions of catalysts A, B, C, D and E were each heated for 16 hours at 1,000° F. and then steamed for 16 hours at 1,500° F. at one atmosphere pressure. The steamed catalysts were evaluated for cracking performance using a 500° to 700° F. virgin gas oil feed at conditions of 950° F., one atmosphere pressure, and a 2 minute process period. Correlated data for these catalysts are compared in the following table at a common 60 weight percent conversion level.

TABLE IV

| | Catalytic Cracking of Virgin Gas Oil 950° F.; 1 atm.; 2-min. cycle; 60 wt. % conversion | | | | |
| --- | --- | --- | --- | --- | --- |
| Catalyst | A | B | C | D | E |
| W/Hr./W | 3.7 | 3.0 | 2.5 | 0.8 | 1.0 |
| Carbon, wt. % | 0.5 | 0.7 | 1.0 | 5.0 | 3.8 |
| $C_3$-Gas, wt. % | 6.2 | 7.3 | 7.6 | 9.0 | 10.8 |
| Total $C_4$, wt. % | 9.8 | 12.0 | 10.6 | 12.5 | 11.9 |
| $C_5$/430° F. Naphtha, wt. % | 43.5 | 40.0 | 40.8 | 33.5 | 33.5 |

The superiority of the catalyst of the invention, catalyst B, over the catalysts of commerce D and E is evident. The cracking performance of catalyst B is similar to that of catalyst A which has a similar composition, and to catalyst C which has an all-synthetic matrix. The superiority of catalyst B over catalyst A was shown in the previous example dealing with their attrition properties. The superiority of catalyst B over catalyst C is one of economics, catalyst B being appreciably lower in production costs.

EXAMPLE 5

Portions of catalysts A, B, and C were oven dried, slurried in water and treated with mixed rare earth chloride. The treat dosage was 2.6 percent with catalyst A and 1.0 percent with catalysts B and C, calculated as mixed rare earth oxide. After a 15 minute period the materials were filtered, water washed, dried, calcined at 1,00020 F. and then steamed 16 hours at 1,500° F. at one atmosphere pressure. The catalysts were then evaluated for cracking performance as described in example 4 above. The results are compared below at a common conversion level of 60 weight percent.

TABLE V

| | Catalytic Cracking of Virgin Gas Oil 950° F.; a atm.; 2-min. cycle; 60 wt. % conversion | | |
| --- | --- | --- | --- |
| Catalyst | A | B | C |
| Rare earth treat dosage, % | 2.6 | 1.0 | 1.0 |
| W/Hr./W | 6.3 | 4.0 | 3.2 |
| Carbon, wt. % | 0.6 | 1.0 | 0.8 |
| $C_3$-Gas, wt. % | 4.8 | 5.6 | 7.4 |
| Total $C_4$, wt. % | 8.1 | 8.9 | 11.3 |
| $C_5$/430° F. Naphtha, wt. % | 46.5 | 44.5 | 40.5 |

The superiority of the catalyst of the invention, catalyst B, over catalyst C is shown both in a higher activity and in an improved selectivity to gasoline. The higher activity of A relative to B is believed to reflect the higher dosage rare earth treat; the superiority of B over A lies in its attrition properties as shown in example 3.

EXAMPLE 6

This example describes the preparation and use of catalysts comprising 5 percent faujasite and 95 percent natural materials such as kaolin.

The following catalyst was prepared using a deagglomerated kaolin according to the teachings of the invention. 200 grams kaolin (173 grams dry basis) were slurried in 1 liter $H_2O$ at 140° to 150° F., and 4 cc. N-brand sodium silicate solution (equivalent to 0.3 grams $Na_2O$/100 grams kaolin) were added. After 2.5 hours, 11.8 grams oven dried $NH_4$-faujasite (9.0 grams after calcining), in the form of a slurry in 100 cc. $H_2O$, were added to the dispersed kaolin slurry. The mixture was stirred for 1 hour, filtered, washed with dilute ammonium sulfate, water washed, and finally dried. After calcining at 1,000° F. this catalyst comprised 5 percent H-faujasite and 95 percent kaolin. It is designated catalyst F and represents a catalyst of the invention.

For purposes of comparison a catalyst was prepared as follows: 110 grams kaolin (95 grams dry basis) were dry mixed with 6.5 grams oven-dried $NH_4$-faujasite (5.0 grams after calcining) and the dry mix then slurried in 300 cc. $H_2O$, colloid milled four times and oven dried. This catalyst after calcining comprised 5 percent H-faujasite and 95 percent kaolin in intimate mixture and is designated catalyst G.

Catalysts F and G were each calcined at 1,000° F. and then steamed 16 hours at 1,400° F. and atmospheric pressure. The catalysts were tested for cracking properties using a 500° to 700° F. virgin gas oil and operating conditions of 950° F., 2 minute cycle, and atmospheric pressure. The following table summarizes results comparing the two catalysts at 60 weight percent conversion level:

TABLE VI

Catalytic Cracking of Virgin Gas Oil
950° F.; atm. pressure; 2 min. cycle;
60 wt. % conversion

| Catalyst | F | G |
| --- | --- | --- |
| Carbon, wt. % | 0.6 | 0.7 |
| $C_3$-Gas, wt. % | 5.9 | 6.1 |
| Total $C_4$, wt. % | 10.1 | 9.0 |
| $C_5$/430° F., wt. % | 43.4 | 44.2 |
| $C_3H_6$, wt. % | 4.1 | 4.2 |
| $C_4H_8$, wt. % | 5.1 | 4.6 |

The data show very little difference between the two catalysts. The advantage of catalyst F over catalyst G lies in the fact that no extensive colloid milling or other mechanical mixing means is required in making catalyst F of the invention.

It is further believed that catalyst F would make a superior pelletized catalyst relative to G for use in fixed bed or moving bed catalytic operations.

The above examples have 5 percent means of dispersing the clay. In view of the known treatment of such clays as halloysite, montmorillonite and kaolinite with mineral acids to convert a portion of their crystalline content to an amorphous gel phase, it is also within the scope of this invention to deagglomerate the clay to the desired particle size range and composition by treatment with the dispersing reagent, e.g. N-brand sodium silicate, by either of the following routes: (1) acid treat the clay, thorough water wash, add the dispersing agent, or (2) deagglomerate the clay with the reagent, then acid treat the dispersed clay slurry, follow with water wash and/or neutralization.

What is claimed is:

1. An improved hydrocarbon conversion catalyst composition comprising a crystalline aluminosilicate zeolite and a clay, said clay having been dispersed into a highly subdivided state prior to its incorporation into said composition, the degree of subdivision being such as to cause about 40 to 95 percent of the clay particles to have a particle size less than 0.3 microns.

2. The composition of claim 1 which additionally comprises a siliceous gel.

3. The composition of claim 1, wherein said zeolite has uniform pore openings of about 7 to about 13 Angstrom units.

4. The composition of claim 2, wherein said zeolite has uniform pore openings of about 7 to about 13 Angstrom units.

5. The composition of claim 1, wherein said clay is kaolin.

6. The composition of claim 2, wherein the degree of subdivision of said clay is sufficient to produce the following particle size distribution:

| % of Total Particles | Particle Size (Microns) |
| --- | --- |
| 50 to 90 | 0.05 to 0.3 |
| 10 to 40 | 0.3 to 0.5 |
| 0 to 10 | 0.5 to 1.0 |

7. The composition of claim 2, wherein 70 to 90 percent of the clay particles have a particle size less than 0.3 microns.

8. The composition of claim 2, wherein said siliceous gel is a cogel of silica and an oxide of at least one metal selected from the group consisting of metals of Groups II-A III-A and IV-B of the Periodic Table.

9. The composition of claim 8, wherein said siliceous gel is silica-alumina.

10. The composition of claim 1, wherein said composition contains about 2 to 25 weight percent of said crystalline zeolite.

11. The composition of claim 2, wherein said composition contains about 2 to 25 weight percent of said zeolite, about 25 to 78 weight percent of said siliceous gel, and about 20 to 50 weight percent clay.

12. In the method of preparing catalyst compositions comprising crystalline aluminosilicate zeolite and clay, the improved means for increasing the attrition resistance of said composition which comprises dispersing said clay into a highly subdivided state prior to its combination with said zeolite, the degree of subdivision being such as to cause about 40 to 95 percent of the clay particles to have a particle size less than 0.3 microns.

13. The improved means of claim 12, wherein a dispersing agent capable of achieving said state of subdivision is added to an aqueous slurry of said clay.

14. The improved means of claim 13, wherein said dispersing agent is sodium silicate.

15. The improved means of claim 12, wherein said catalyst composition additionally comprises a siliceous gel.

16. The improved means of claim 12, wherein said clay is kaolin.

17. The improved means of claim 12, wherein said degree of subdivision is as follows:

| % of Total Particles | Particle Size (Microns) |
| --- | --- |
| 50 to 90 | 0.05 to 0.3 |
| 10 to 40 | 0.3 to 0.5 |
| 0 to 10 tn 0.5 to 1.0 | |

18. A method for increasing the attrition resistance of catalyst compositions comprising crystalline aluminosilicate zeolites and clay which comprises dispersing said clay into a highly subdivided state prior to its combination with said zeolite utilizing a dispersing agent selected from the group consisting of alkali metal phosphates, alkali metal carbonates and alkali metal silicates.

19. The method of claim 18 wherein said dispersing agent is sodium silicate.